United States Patent [19]
Foote et al.

[11] Patent Number: 5,542,447
[45] Date of Patent: Aug. 6, 1996

[54] AIRCREW BREATHING SYSTEMS

[75] Inventors: James C. Foote, Halstock; Derrick J. Puplett, Sherborne, both of United Kingdom

[73] Assignee: Normalair-Garrett (Holdings) Limited, Yeovil, England

[21] Appl. No.: 372,123

[22] Filed: Jan. 13, 1995

[30] Foreign Application Priority Data

Jan. 18, 1994 [GB] United Kingdom ............... 9400906
Mar. 20, 1994 [GB] United Kingdom ............... 9403956

[51] Int. Cl.⁶ ............................................. F16K 11/044
[52] U.S. Cl. ................ 137/113; 128/204.29; 128/205.24
[58] Field of Search .................... 137/111, 112, 137/113, 606, 613; 128/204.26, 204.29, 205.24

[56] References Cited

U.S. PATENT DOCUMENTS

| | | | |
|---|---|---|---|
| 1,172,833 | 2/1916 | Ricker . | |
| 1,849,702 | 3/1932 | Bard | 137/113 |
| 3,456,642 | 7/1969 | Cupp | 128/204.29 X |
| 3,592,215 | 7/1971 | Davis | 137/113 |
| 3,823,556 | 7/1974 | Goto et al. | 60/288 |
| 3,910,303 | 10/1975 | Rydberg | 137/112 |
| 4,281,677 | 8/1981 | Hoffman | 137/113 |
| 4,499,914 | 2/1985 | Schebler | 128/204.29 X |
| 4,619,255 | 10/1986 | Spinosa et al. . | |
| 4,641,686 | 2/1987 | Thompson . | |
| 4,651,728 | 3/1987 | Gupta et al. | 128/204.29 |
| 4,924,911 | 5/1990 | Schmalenbach et al. . | |

FOREIGN PATENT DOCUMENTS

| | | |
|---|---|---|
| 2249728 | 5/1992 | United Kingdom . |
| 89/09903 | 10/1989 | WIPO . |
| 91/14122 | 9/1991 | WIPO . |

*Primary Examiner*—Stephen M. Hepperle
*Attorney, Agent, or Firm*—Larson & Taylor

[57] ABSTRACT

A two-way check valve for a breathing gas supply assembly, comprises a body, a first inlet in the body for receiving a normal breathing gas flow, an outlet for delivering a gas flow from the body, first passage means communicating the first inlet with the outlet, second passage means communicating the second inlet with the outlet, a valve member mounted internally of the body so as to be movable between a first position in which it closes communication between the second inlet and the outlet and a second position in which it closes communication between the first inlet and the outlet, and resilient means biasing the valve member towards the first position.

8 Claims, 3 Drawing Sheets

AIRCREW BREATHING SYSTEMS

BACKGROUND TO THE INVENTION

This invention relates to a check valve for a breathing gas supply system and more particularly with such a breathing gas supply system for use by an aircrew.

DESCRIPTION OF THE PRIOR ART

In modern day aircraft oxygen-enriched breathing gas for breathing by an aircrew member is usually provided by an on board oxygen generating system (OBOGS) which includes a molecular sieve oxygen concentrator (MSOC). Oxygen enriched breathing gas is delivered from the MSOC to a breathing mask worn by the aircrew member by way of a breathing demand regulator, hereinafter referred to as "the main regulator", connection between the breathing mask and the main regulator being by way of a flexible hose. Such main regulators are disclosed in EP-A-0078644, EP-A-0263677 and EP-A-0448258 (Normalair Garrett). For the protection and comfort of the aircrew member in situations where excessive breathing pressure may be otherwise experienced, for example, high rates of climb, explosive decompression, hose pumping due to head movement, and overshoot during work and speech, the regulator is provided with a pressure relief valve for venting breathing gas to ambient. In acceptable breathing pressure conditions this pressure relief valve is held closed by a spring and a compensating pressure which is referenced to pressure in a breathing pressure control chamber of the regulator. As is more fully explained in EP-A-0263677 and EP-A-0448258, provision is made to increase the pressure in the breathing pressure control chamber so as to raise the breathing gas pressure at the regulator outlet thereby to maintain a physiologically acceptable level of oxygen partial pressure in the breathing gas supplied to the aircrew member during exposure to high cabin altitudes (low ambient pressure) and/or high G-load. This is referred to as pressure breathing with altitude (PBA) and pressure breathing with G(PBG), respectively. In these circumstances the increased pressure in the control chamber is effective on the pressure relief valve so that it is held closed under all normal conditions of pressure breathing.

As is well known, emergency oxygen for breathing in the event of the aircrew member having to bail out of the aircraft is provided by 100% oxygen gas stored in a pressurised bottle carried on an ejection seat. In addition, this source of oxygen can be used for breathing to permit the aircrew member to fly the aircraft back to the ground in the event of malfunction of the normal breathing system.

When the main regulator is mounted on the ejection seat or attached to a flying suit worn by the aircrew member, provision is made for breathing gas from the OBOGS and, in the event of an emergency, oxygen from the emergency oxygen bottle, to be supplied to an inlet of the main regulator by way of a services connector. In this case only a single hose is required between the services connector and the regulator inlet, and between the breathing mask and the regulator outlet.

However, in some aircraft it is a requirement that the main regulator be mounted on a fixed part of the aircraft. In this case a second regulator mounted on the seat, hereinafter referred to as an emergency regulator, must be provided to control delivery of oxygen from the oxygen bottle to the breathing mask in an emergency such as bail out from the aircraft. In such a breathing system two hoses must be provided, one connecting between the main regulator and the mask, and the other between the emergency regulator and the mask. To avoid complication at the breathing mask it is usual for the two hoses to merge into a single hose for connection with the breathing mask.

A problem has been identified with this arrangement when the pressure relief valve of the main regulator has a low cracking pressure, for example, in the range 0.5 to 1.0 kPa (2 to 4 inches WG). In the event that emergency oxygen is required to be used, the oxygen gas flows to the junction of the two hoses and then back along the hose to the main regulator. There it is dumped to ambient by way of the pressure relief valve as soon as the cracking pressure of the valve is exceeded because there is no increase in control pressure in the breathing pressure control chamber of the main regulator effective to hold the valve closed.

It is an object of the present invention to overcome the aforementioned problem.

SUMMARY OF THE INVENTION

Accordingly, in its broadest aspect the present invention comprises a two-way check valve for a breathing gas supply assembly, the valve comprising a body, a first inlet in the body for receiving a normal breathing gas flow, a second inlet in the body for receiving an emergency oxygen gas flow, an outlet for delivering a gas flow from the, body, first passage means communicating the first inlet with the outlet, second passage means communicating the second inlet with the outlet, a valve member mounted internally of the body so as to be moveable between a first position in which it closes communication between the second inlet and the outlet and a second position in which it closes communication between the first inlet and the outlet, and resilient means biasing the valve member towards the first position.

In a preferred form of the invention the first passage means and the second passage means each incorporate a valve seat with the valve seats being opposed to each other on opposite sides of the valve member.

In one embodiment of the invention the valve member comprises a first valve element opposed to the valve seat in the first passage means and a second valve element opposed to the valve seat in the second passage means, the second valve element having a larger surface area than the first valve element and the two valve elements being connected for movement with each other.

The valve elements may be carried by diaphragms having their marginal edges mounted in the body.

In another embodiment of the invention the valve member comprises a valve element carried at one end of a stem which extends in to a chamber which is divided by a diaphragm mounted plate member carried by the stem, into two sub-chambers, the sub-chamber on the outer end face of the plate member having an inlet for receiving a bleed of emergency oxygen gas.

If desired, to reduce the number of supply hoses and thereby effect weight and cost savings a two-way check valve in accordance with the invention may be provided integrally with an emergency oxygen breathing regulator so that the second inlet of the two-way valve is continuous with an outlet from the regulator.

In another aspect the present invention provides a breathing gas supply assembly including a two way check valve comprising a body, a first inlet for receiving a flow of normal breathing gas, a second inlet for receiving a flow of emergency oxygen, an outlet for delivering a gas flow from the body, first passage means communicating the first inlet with the outlet, second passage means communicating the second inlet with the outlet, a valve member mounted internally of the body so as to be moveable between a first position in which is closes communication between the second inlet and the outlet and a second position in which it closes communication between the first inlet and the outlet, and resilient means biasing the valve member towards the first position; a first hose having one end connected with the first inlet and an opposite end adapted for connection to a main breathing regulator; a second hose having one end connected with the second inlet and an opposite end adapted for connection to an emergency breathing regulator; and a third hose having one end connected to the outlet and an opposite end adapted for connection to a breathing mask.

The first and/or second and/or third hoses may be flexible in nature according to another as part of the present invention we provide an aircrew breathing system comprising a breathing gas supply hose assembly in accordance with the aforementioned aspect of the invention, a main breathing regulator having an outlet connected to the opposite end of the first hose and an inlet connected to a molecular sieve oxygen concentrator, an emergency breathing regulator having an outlet connected to the opposite end of the second hose and an inlet connected to an oxygen gas bottle, and a breathing mask connected to the opposite end of the third hose.

BRIEF DESCRIPTION OF THE DRAWINGS

The invention will now be further described by way of example and with reference to the accompanying drawings in which.

DETAILED DESCRIPTION OF THE PREFERRED EMBODIMENT

Figure 1:
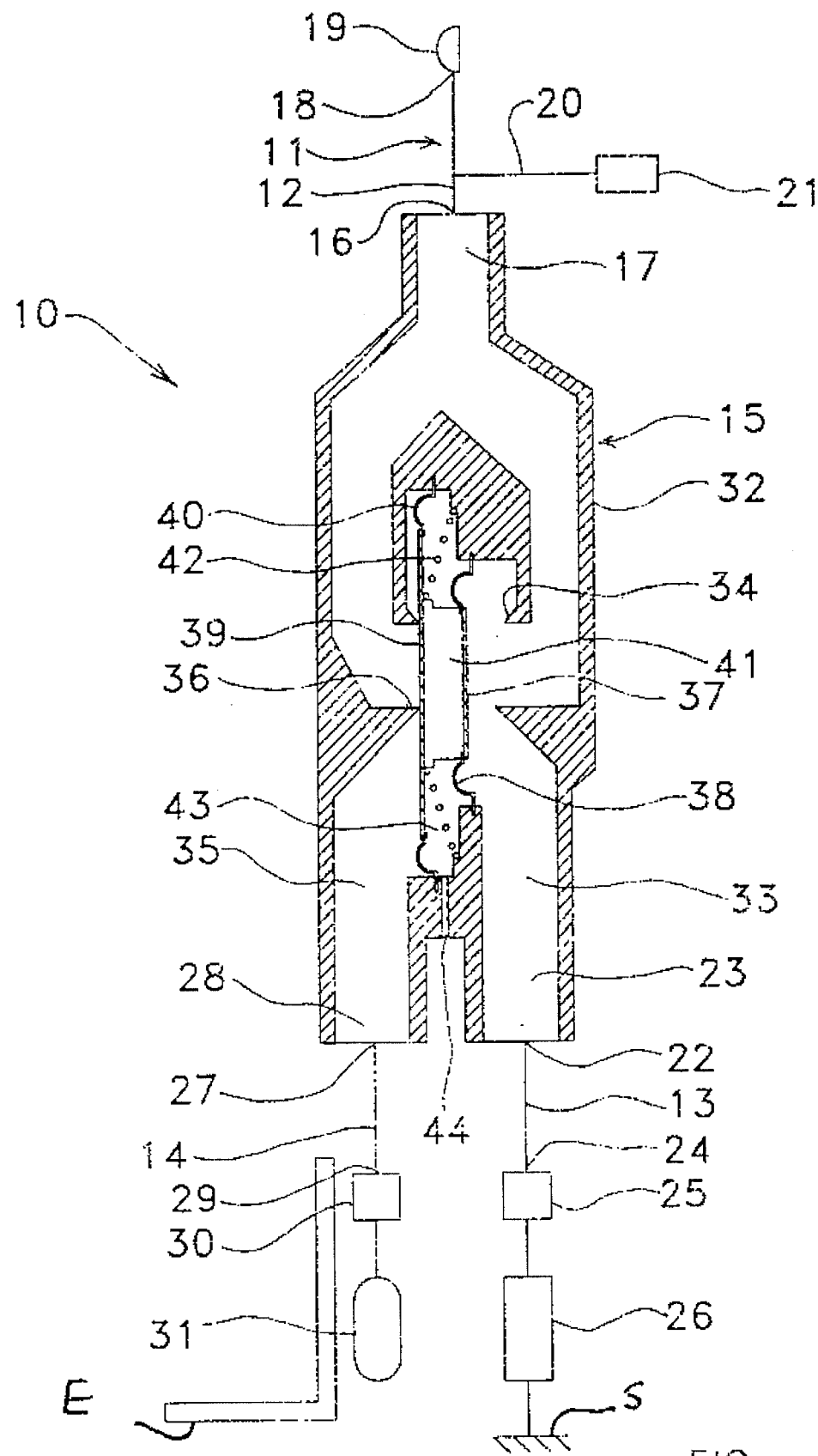
FIG. 1 schematically illustrates and aircrew breathing system including a breathing gas supply assembly incorporating a two-way check valve in accordance with one embodiment of the present invention.

An aircrew breathing system 10, as shown in FIG. 1, includes a breathing gas supply hose assembly 11 comprising a first flexible hose 12 connected to second and third flexible hoses 13 and 14, respectively by way of a two-way check valve 15. The first hose 12 has one end 16 connected with an outlet 17 from the check valve 15, and an opposite end 18 connected with an aircrew breathing mask 19. A flexible hose or pipe 20 is tapped into the hose 12 and connects with an aircrew chest counter pressure garment 21 to provide for inflation of this by breathing gas to assist exhalation during positive pressure breathing.

The second hose 13 is connected at one end 22 with a first inlet 23 in the check valve 15, and at its opposite end 24 with a main breathing regulator 25 which controls delivery of oxygen enriched breathing gas from a source of breathing gas, such as a molecular sieve oxygen concentrator (MSOC) 26. The main regulator 25 is mounted on the rigid structurea of the aircraft.

The third hose 14 has one end 27 connected to second inlet 28 in the check valve 15 and its opposite end 29 connected with an emergency regulator 30 mounted on an aircrew ejection seat E. The emergency regulator is further connected with at, oxygen gas bottle 31 carried on the ejection seat E and controls delivery of oxygen from the bottle to the face mask 19 when a bottle sealing device (not shown) is activated to release oxygen from the bottle in the event of an emergency.

The check valve 15 comprises a body 32 providing a first passageway 33 extending from the first inlet 23 to the outlet 17 by way of a valve seat 34, and a second passageway, 35 extending from the second inlet 28 to the outlet 17 by way of a valve seat 36.

The valve seat 34, 36 are opposed to each other on either side of a valve member comprised by first and second valve plates 37 and 39, respectively.

The first valve plate 37 is carried by a diaphragm 38 having its marginal edge portion mounted in structure of the body 32. The second valve plate 39 is of larger surface area than the first valve plate 37 and is carried by a diaphragm 40 which also has its marginal edge portion mounted in the structure of the body 32. The valve plates 37 and 39 are spaced from each other by a spacer block 41 with which they may integrally formed or to which they may be attached so that they move together. A spring 42 acts between the second valve plate 39 and the body 32 to bias the second valve plate 39 towards closing with the valve seat 36 and to bias the first valve plate 37 away from the valve seat 34. An annular space 43 defined by the diaphragms, valve plates, spacer block and body, is communicated with ambient pressure by a drilling 44.

In operation of the breathing system, with breathing gas supplied to the main regulator inlet a safety pressure of, for example, 250Pa (1 inch WG) is produced at the regulator outlet by arranging for a valve head of a demand valve of the regulator to be held off a valve seat sufficient to produce this safety pressure. This is more particularly described, for example, in EP-A-0078644. Because the valve plate 37 is biased away from the valve seat 34 by the spring 42, this safety pressure is produced in the face mask 19 and also acts on the valve plate 37 to further urge the valve plate 39 towards closing with the valve seat 36.

In an emergency when the oxygen bottle 31 is activated to deliver oxygen gas to the emergency regulator 30, this regulator also produces a safety pressure at the regulator outlet in like manner to the main regulator 25. This safety pressure is sensed on that surface area of the valve plate 39 which encompasses the valve seat 36. This surface area is such that the action of the safety pressure overcomes the biasing action of the spring 42 and any breathing gas pressure on the valve plate 37, to move the valve plate 39 away from the valve seat 36 and with it the valve plate 37 towards closing with the valve seat 34. Oxygen gas then flows by way of the passageway 35, outlet 16 and hose 12 to the breathing mask 19 but is prevented from flowing back along passageway 33 to the main regulator 25 because of the valve plate 37 closing with the valve seat 34.

Figure 2:
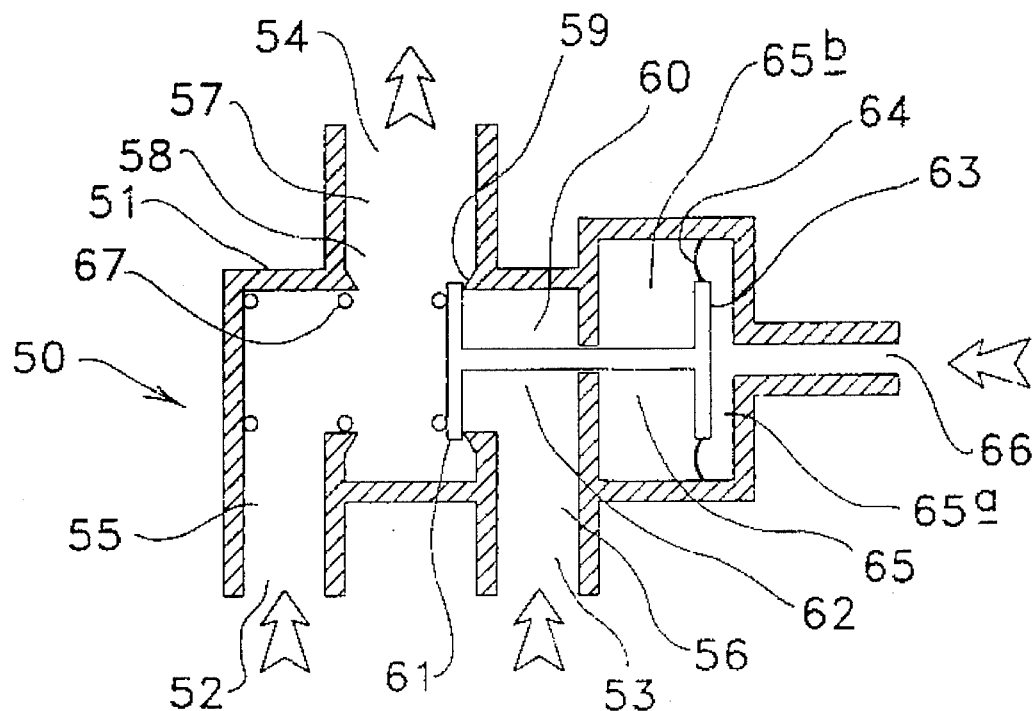
FIG. 2 is a schematic cross-sectional view of a two-way check valve in accordance with another embodiment of the invention showing a valve member positioned for closing communication between an emergency oxygen inlet and an outlet.
Figure 3:
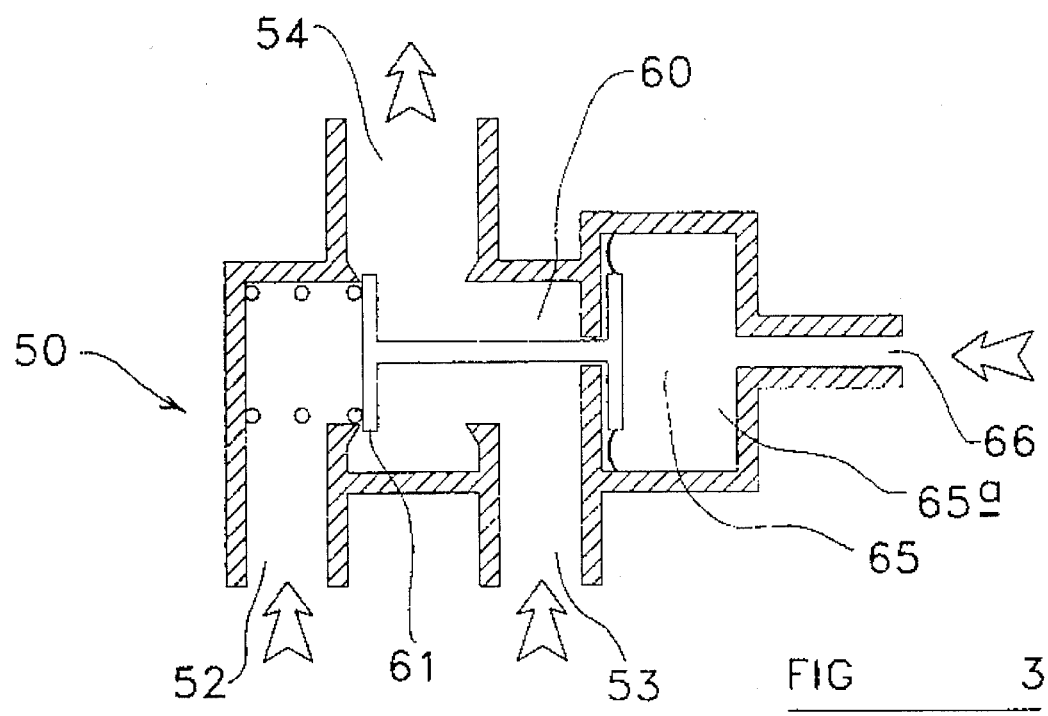
FIG. 3 is a schematic cross-sectional view of the two-way check valve shown in FIG. 2 with the valve member positioned for closing communication between a breathing gas inlet and the outlet.

Referring now to FIGS. 2 and 3, a two-way check valve 50 in accordance with another embodiment of the invention comprises a body 51 having a first inlet 52 for receiving breathing gas, a second inlet 53 for receiving emergency oxygen gas, and an outlet 54 for delivering one or other of the gases to a breathing mask (not shown). A first passageway 55 extends from the first inlet 52 and a second passage 56 extends from the second inlet 53 to join with a third passageway 57 communicating with the outlet 54. Opposed valve seats 58 and 59, respectively, are provided in the third passageway at the respective junctions of the first and second passageways. A valve member 60 has a valve plate 61 which is movable between a first position in which it closes with the valve seat 59 (as shown in FIG. 2) and a second position in which is closes with valve seat 58 (as shown in FIG. 3). The valve plate 61 is carried at one end of a stem 62 projected by a plate member 63 mounted by a diaphragm 64 in a chamber 65 provided internally of the check valve body 51. The plate member 63 and diaphragm 64 divide the chamber 65 into two sub-chambers 65a and 65b. A third inlet 66 in the body 51 communicates with the sub-chamber 65a whereby the sub-chamber 65a may be pressurised by a bleed of emergency oxygen gas. A spring 67 acts between the body 51 and an outer face of the valve plate 61 to bias the valve member 60 towards a position in which the valve plate closes with the valve seat 59 and communication is made between the first inlet 52 and the outlet 54 (as shown in FIG. 2).

When emergency oxygen is selected a bleed of this gas is delivered to the sub-chamber 65a to build up a pressure therein which acts on the diaphragm mounted plate member to move the valve member 60 against the biasing action of the spring 67 to a position in which the valve plate 61 closes with the valve seat 58 (as shown in FIG. 3). With the valve member in this position communication between the first inlet 52 and the outlet 54 is closed and communication between the second inlet 53 and the outlet is open.

The check valve 50 disclosed by this embodiment of the invention provides for emergency oxygen to be delivered to the outlet 54 when breathing gas continues to be available at the first inlet 52. This is made possible by the pressure of emergency oxygen gas in sub-chamber 65a being such as to overcome the action of the spring 67 on the valve plate 61. Thus, the check valve 50 is particularly suited for use in an aircrew breathing system having facility for an aircrew member to make manual selection between breathing gas and emergency oxygen.

Figure 4:
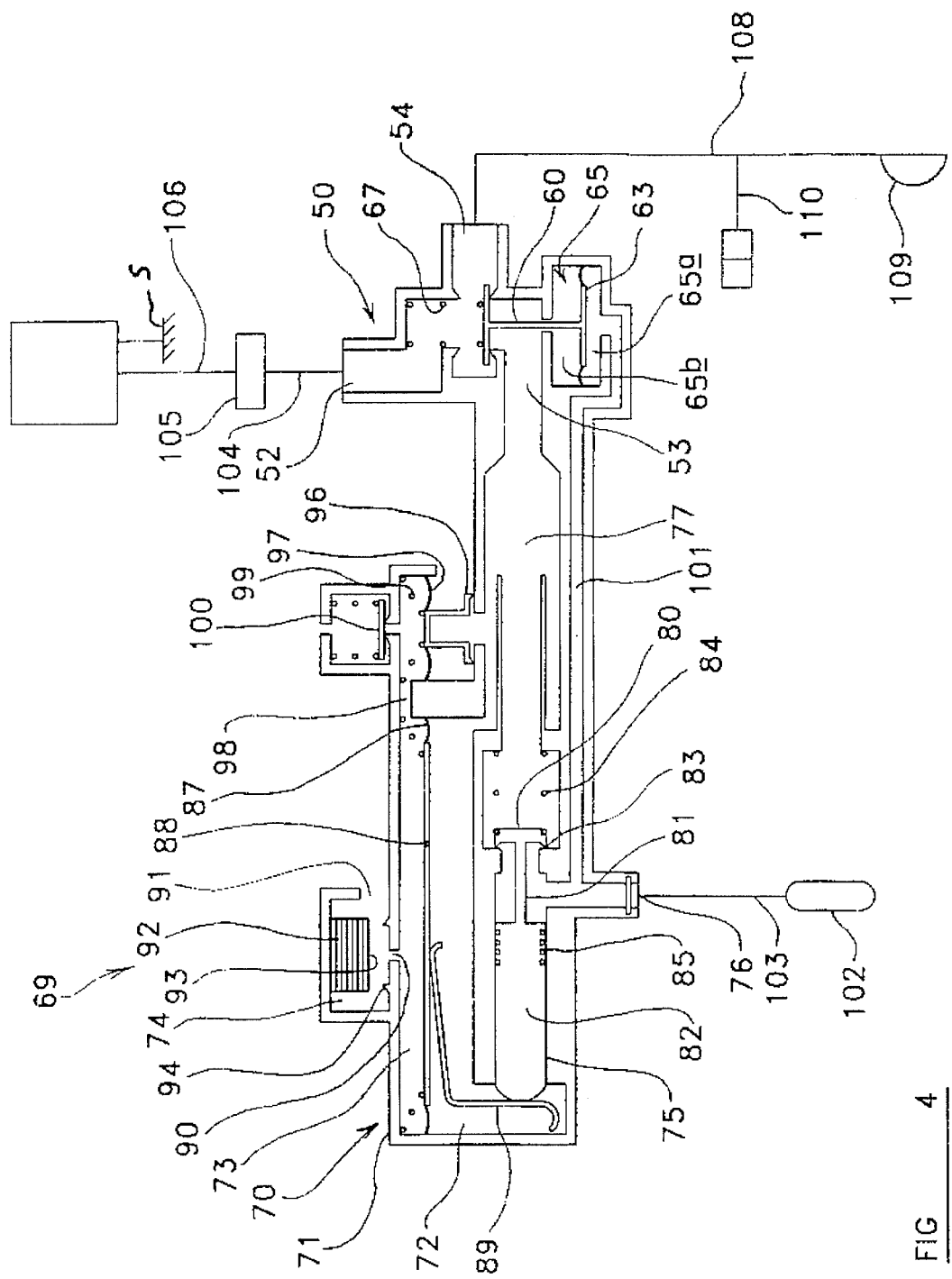
FIG. 4 is a schematic illustration of an aircrew breathing system having a two-way check valve similar to that shown in FIGS. 2 and 3, but provided integrally with an emergency oxygen breathing regulator.

An aircraft aircrew breathing system 69, as shown in FIG. 4, combines a check valve 50 as hereinbefore described with reference to and shown in FIGS. 2 and 3, with an emergency oxygen gas breathing regulator 70 in an integral body assembly 71. Where reference is made to component parts of the check valve 50 like reference numerals will be used as are used in the description of FIGS. 2 and 3.

The emergency oxygen gas breathing regulator 70, which is of similar construction to the breathable gas delivery regulator disclosed by EP-A-0078644 (Normalair Garrett), comprises a demand-pressure sensing chamber 72, a breathing-pressure control chamber 73, an ambient pressure sensing chamber 74, a demand valve 75, an emergency oxygen gas supply inlet 76 and an emergency oxygen gas delivery outlet 77. The second inlet 53 of the check valve 50 is provided as a continuum of the delivery outlet 77.

The demand valve 75 comprises a valve head 80 which is carried by a spindle 81 from a spool 82. The flow path between the inlet 76 and delivery outlet 77 is partly defined by a valve seat 83 onto the downstream face of which the valve head 80 is urged to close by a compression spring 84.

The spool 82 is arranged to project into the demand-pressure sensing chamber 72 and is provided on its circumferential surface with grooves in a manner forming a labyrinth seal 85.

The demand-pressure sensing chamber 72 is fluidly connected to the outlet 77 and is separated from the breathing-pressure control, chamber 73 by a pressure-responsive flexible diaphragm 87 which is provided with a bleed orifice 88 in order to permit a small flow to pass from one chamber to the other. The centre of the diaphragm 87 rests on one end of a valve-operating lever which is arranged to rock about its appropriately formed opposite end.

The breathing-pressure control chamber 73 is provided with an outlet port 90 in one wall which communicates with the ambient pressure sensing chamber 74. An outlet port 91 communicates the chamber 74 with pressure ambient to the regulator. The chamber 74 houses an aneroid capsule 92 which carries a valve plate 93. When low ambient pressure is sensed in the chamber 74 the aneroid expands to move the valve plate 93 towards closing with a valve seat 94 that encompasses the port 90 thereby restricting escape gas from breathing pressure control chamber 73 to ambient by way of ports 90 and 91.

A pressure-compensating relief valve 95 is mounted on the outlet 77 and comprises a valve head 96 carried on a flexible diaphragm 97. The valve is connected so as to be responsive to gas pressure in the breathing-pressure control chamber 73 by way of a duct 98 and is arranged, by inclusion of a light spring 99 to relieve when pressure in the outlet 77 is, say, 625 Pa (2.5 inch WG) above that in the control chamber 73. The duct 98 is also connected with a pressure-relief valve 100 that is arranged to open when predetermined maximum pressure, say, 4.5 kPa (18 inch WG) occurs in the breathing-pressure control chamber 73.

A duct 101 in the body 71 branches from the emergency oxygen inlet 76 and connects at its opposite end with sub-chamber 62a of check valve 50.

An aircraft ejection seat mounted emergency oxygen gas bottle 102 is connected by a line 103 with the inlet 76, the bottle incorporating a mechanism (not shown) whereby oxygen gas may be automatically released from the bottle in the event of an emergency such as, for example, decompression of the aircraft cabin or bail-out from the aircraft. If required this mechanism may provide a facility for manual selection of emergency oxygen by an aircrew member. The first inlet 52 of the check valve 50 is connected by a hose line 104 with a main breathing regulator 105 which may be combined with a G-suit inflation control valve such as is disclosed in EP-A-0448258 (Normalair Garrett). Regulator 105 is connected by a line 106 for receiving oxygen-enriched breathing gas produced by a molecular sieve oxygen concentrator 107 such as is disclosed in EP-A-0225736 (Normalair Garrett). The outlet 54 of check valve 50 is connected by a hose 4 line 108 with a breathing mask 109, and by a branch hose line 110 whit a chest counter pressure garment 111.

As shown in FIG. 4, valve member 60 is biased by spring 67 towards closing communication between the second inlet 53 and outlet 54 so that oxygen-enriched breathable gas flows from the main regulator 105 to the first inlet 52 and then to the outlet 54.

When the emergency oxygen gas bottle release mechanism is activated emergency oxygen gas is made available at the inlet 76 and is bled away by way of duct 101 to the sub-chamber 65a. Emergency oxygen gas pressure in sub-chamber 65a acts on the diaphragm mounted valve plate to move the valve member, against the bias of spring 67, towards its opposite extreme position in which it closes communication between the first inlet 52 and the outlet 54. Emergency oxygen gas is then able to flow, in response to sensed breathing demands, by way of the demand valve 75 to regulator outlet 77 and then by way of the second inlet 53 to the outlet 54 and, hence, to the breathing mask.

It will be appreciated that the embodiments of the invention hereinbefore described with reference to the accompanying drawing are by way of example and that modifications are possible within the scope of the invention.

For example the diaphragm mounted plate 63 located in chamber 65 of check valve 50 could be replaced by a piston and cylinder arrangement. Also, the spring 67 of check valve 50 could be located in sub-chamber 65*b* so as to act between the body and the plate member 63.

We claim:

1. A breathing gas supply assembly including a two way check valve comprising a body, a first inlet for receiving a flow of normal breathing gas, a second inlet for receiving a flow of emergency oxygen, an outlet for delivering a gas flow from the body, first passage means communicating the first inlet with the outlet, second passage means communicating the second inlet with the outlet, a valve member mounted internally of the body so as to be moveable between a first position in which it closes communication between the second inlet and the outlet and a second position in which it closes communication between the first inlet and the outlet, and resilient means biasing the valve member towards the first position, a first hose having one end connected with the first inlet and an opposite end adapted for connection to a main breathing regulator, a second hose having one end connected with the second inlet and an opposite end adapted for connection to an emergency breathing regulator, and a third hose having one end connected to the outlet and an opposite end adapted for connection to a breathing mask.

2. An assembly according to claim 1 wherein at least one of the first and second and third hoses are flexible.

3. An aircrew breathing system comprising a breathing gas supply assembly in accordance with claim 1, a main breathing regulator having an outlet connected to the opposite end of the first hose and an inlet connected to a molecular sieve oxygen concentrator, an emergency breathing regulator having an outlet connected to the opposite end of the second hose and an inlet connected to an oxygen gas bottle, and a breathing mask connected to the opposite end of the third hose.

4. A two-way check valve for a breathing gas supply assembly, the valve comprising a body having first and second opposite ends, a first inlet at the first end of the body for receiving a normal breathing gas flow, a second inlet at the first end of the body for receiving an emergency breathing gas flow, and an outlet at the second end of the body for delivering a gas flow from the body, first passage means communicating the first inlet with the outlet and extending from the first to the second end of the body, second passage means communicating the second inlet with the outlet and extending from the first to the second end of the body, the first passage means and the second passage means each incorporating a valve seat with the valve seats being opposed to each other on opposite sides of a valve member, means mounting the valve member internally of the body so as to be movable generally laterally of the first and second passage means between a first position in which it engages the valve seat of the second passage means and thereby closes communication between the second inlet and the outlet, and a second position in which it engages the valve seat of the first passage means and thereby closes communication between the first inlet and the outlet, resilient means biasing the valve member towards the first position, the valve member comprising a first valve element opposed to the valve seat in the first passage means and a second valve element opposed to the valve seat in the second passage means, the second valve element having a larger surface area acted upon by second inlet pressure than the surface area of the first valve element exposed to first inlet pressure and the two valve elements being connected for movement with each other.

5. A two-way check valve provided integrally with an emergency oxygen breathing regulator, the valve comprising a body, a first inlet in the body for receiving a normal breathing gas flow, a second inlet in the body for receiving an emergency breathing gas flow, and an outlet for delivering a gas flow from the body, first passage means communicating the first inlet with the outlet, second passage means communicating the second inlet with the outlet, a valve member, means mounting the valve member internally of the body so as to be movable between a first position in which it closes communication between the second inlet and the outlet and a second position in which it closes communication between the first inlet and the outlet, and resilient means biasing the valve member towards the first position, the second inlet of the two-way check valve being continuous with an outlet from the regulator.

6. A valve according to claim 4 wherein each of the valve elements are carried by diaphragms having their marginal edges mounted in the body.

7. A valve according to claim 4 wherein the valve member comprises a valve element carried at one end of a stem.

8. A valve according to claim 7 wherein the stem extends to a chamber which is divided by a diaphragm mounted plate member carried by the stem, into two sub-chambers, the sub-chamber on the outer end face of the plate member having an inlet for receiving a bleed of emergency oxygen gas.

\* \* \* \* \*